UNITED STATES PATENT OFFICE 2,484,037

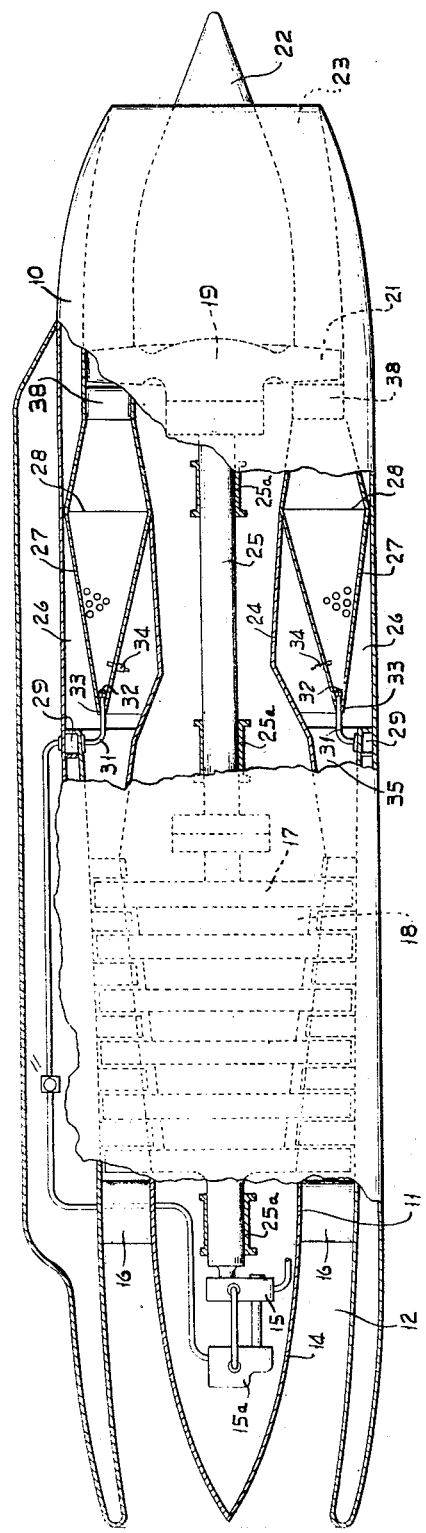

ATOMIZING STRUCTURE

Alexander S. King, Jr., Prospect Park, Pa., assignor to Westinghouse Electric Corporation, East Pittsburgh, Pa., a corporation of Pennsylvania Application May 29, 1945, Serial No. 596,508

3 Claims. (Cl. 299—120)

This invention relates to liquid fuel atomizing nozzles, more particularly to nozzles of that type for use in gas turbine power plants, and has for an object to provide an improved device of this character.

Another object of the invention is to provide a liquid fuel nozzle capable of atomizing the fuel at a much lower pressure than is possible with previously known nozzles.

A further object of the invention is to provide a liquid fuel nozzle capable of atomizing the fuel at a much lower rate of flow than is possible with previously known nozzles.

While nozzles constructed in accordance with the present invention will be found useful in many situations and types of apparatus, they are particularly useful in combustion apparatus for gas turbine power plants.

A typical power plant of the type referred to is disclosed in the copending application of Stewart Way, Serial No. 482,533, filed April 10, 1943, now Patent No. 2,405,723 wherein there is described a gas turbine power plant for propulsion of aircraft, and includes an air compressor, air heating apparatus, a turbine, and a propulsion jet nozzle all housed within a streamlined tubular casing. A plant of this character is particularly suitable for propelling aircraft at high speeds and operates generally as follows: Air enters the forward end of the tubular casing and is compressed in the compressor, the compressed air is then heated in the heating apparatus by combustion of fuel, supported by the compressed air. The resulting motive fluid, comprising the products of combustion and the excess compressed air, drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by suitable means, for example, a positive displacement pump which is preferably driven by the turbine.

Accordingly, it is a further object of the invention to provide a liquid fuel nozzle capable of improving fuel atomization in combustion apparatus of gas turbine power plants for aircraft.

These and other objects are effected by the invention as will be apparent from the following description and claims taken in connection with the accompanying drawings, forming a part of this application, in which:

Fig. 1 is a longitudinal view of apparatus embodying the present invention, portions of the apparatus being broken away for the sake of clearness;

Fig. 2 is an enlarged longitudinal sectional view of a liquid fuel atomizing nozzle used in the apparatus shown in Fig. 1, and constructed in accordance with the invention;

Fig. 3 is an exploded sectional view of the structure shown in Fig. 2; and,

Fig. 4 is a view taken along the line IV—IV of Fig. 3 looking in the direction indicated by the arrows.

The power plant shown in Fig. 1 comprises in general an outer casing structure 10, open from end to end, and having a central core structure 11 providing an annular flow passage 12, which extends fore and aft with respect to the aircraft in which it is mounted. The central core structure 11 is supported by the casing structure along its longitudinal axis and includes a hollow fairing cone 14, defining with the forward or left end of the casing 10, as viewed in Fig. 1, the inlet portion of the flow passage 12. The fairing cone houses a fuel pump, generally indicated 15, and other auxiliary apparatus for example, fuel controls 15a, and is supported from the casing by hollow compressor guide vanes 16. The core structure also includes the rotor 17 of an axial flow compressor 18, the fixed blades of which are carried by the casing 10, the rotor 19 of a turbine 21, and a conical tailpiece 22 which defines, with the rear end of the casing structure, a propulsion nozzle 23. The intermediate portion of the core structure between the compressor and the turbine comprises an inner wall structure 24, which houses a shaft 25 connecting the turbine rotor 19 and compressor rotor 17, and defines with the casing 10 an annular combustion chamber 26. The shaft 25 is journaled in suitable bearings 25a, carried by the outer casing.

The combustion chamber 26 is provided with a suitable burner or burners, such as shown in the copending application of Way et al., Serial No. 511,468, filed November 23, 1943, for heating the air compressed by the compressor. In the embodiment shown herein, a perforated, tapered, annular burner tube 27 is mounted in the annular combustion chamber 26 with its large open end 28 directed downstream. Fuel under pressure is supplied to the burner tube from a manifold pipe 29 connected to a fuel supply and is fed from the manifold through branch pipes 31 to atomizing nozzles 32 extending into the burner tube through the small closed end 33 thereof. Suitable means, including spark plugs 34, extending into the burner tube, are provided for igniting the air-fuel mixture.

The power plant operates substantially as follows: Air enters the casing 10 at the inlet of the flow passage 12, is compressed by the compressor, and flows into a diffuser or divergent portion 35 of the flow passage, which effects a further compression of the air. The compressed air then passes through the openings provided in the walls of the burner tube 27. The compressed air mixes with the fuel atomized in the tube by the nozzles 32. The air and fuel mixture is ignited by the spark plugs and burns steadily thereafter. The hot gases or motive fluid comprising the products of combustion and the excess air heated by the combustion, on leaving the burner tube 27 are directed by fixed guide vanes or nozzles 38, of the turbine 21, into the passage of the turbine rotor 19. The turbine extracts at least sufficient energy from the motive fluid to drive the compressor 18, pump 15, fuel controls 15a, and other auxiliary apparatus that may be housed in the fairing cone 14. The spent gases leaving the turbine are discharged through the propulsion nozzle 23 at a high velocity, so that the remaining energy in the motive fluid is available to propel the aircraft. The tailpiece 22 is preferably axially movable with respect to the casing structure so that the back pressure on the turbine and the jet effect produced by the nozzle may be varied.

The present invention is particularly concerned with the construction and operation of the nozzles 32, and inasmuch as they preferably are similar, only one will be hereinafter described.

Referring now particularly to Figs. 2, 3 and 4, the nozzle 32 is comprised by a shell 50 having a cylindrical bore 51 therein, closed at the front or forward end by the wall 52 which, preferably, has a convex outer surface 53 and a conical inner surface 54, the wall 52 being provided with an emission opening 56 at the apex of the conical inner wall 54, and concentric with respect to the longitudinal axis of the cylindrical bore 51.

The cylindrical bore 51 is internally threaded as at 57, for a portion of its length adjacent the rearward or open end thereof for reception of a core assembly, indicated in its entirety by the reference character 58. Core member 60 has an external flange 61 provided with threads 62 for engagement with the internal threads 57 of the nozzle shell 50, the rearward portion of the core member being provided with a bore 63 and the central and forward portion thereof having a bore 64 of greater diameter than of the bore 63.

A swirl member 66, having a cylindrical portion 67 adapted to be frictionally received within the bore 64 of the core member 60, is provided with a head portion 68, having a shoulder 69 adapted to abut the mating shoulder 71 at the end of the core member 60, to limit the inward position of the swirl member with respect to the enlarged cylindrical bore 64 of the core member. The forward end of the swirl member 66 is provided with a recess having a conical bottom wall 72 and a circular side wall 73 providing a swirl chamber 73a. The end face 74 of the swirl member 66 is preferably conical and formed at an angle corresponding to the angle of the conical surface 54 of the shell end wall 52. This end surface 74 is provided with a plurality of passages 76, extending from periphery of the swirl member head 68 to the annular wall 73 of the swirl chamber 73a, for a purpose to be hereinafter described. Preferably, these passages or channels 76 are disposed in a substantially tangential relation to the annular wall 73 of the swirl chamber 73a.

The shoulder 69 on the swirl member 66 serves to position the rearward end of the swirl member in spaced relation to the inner end of the smaller bore 63 of the core member 60, thereby providing a chamber 78 to which liquid fuel under pressure may be supplied through the bore 63. One or more openings 79 are provided in the wall of the chamber 78 and serve to conduct fuel from the chamber 78 to the annular space 81 between the core member 60 and the shell 50, when the former is assembled within the latter, as indicated in Fig. 2.

Positioned between the conical surfaces 54 and 74 of the shell and swirl members, respectively, is an orifice plate 83, having an edge portion 84 of conical form to mate with the conical surfaces 54 and 74 between which it is fixedly clamped. A central portion 85 of the orifice plate extends at right angles to the longitudinal axis of the cylindrical bore 51 and is provided with an opening 86 concentric about said axis of the cylindrical bore 51. It will be apparent from consideration of Fig. 2, that this orifice member 83 provides chambers at opposite sides thereof with the orifice 86 providing communication therebetween.

The passages 76 (Fig. 4) previously described, serve to admit fuel from the annular space 81 to the interior of the swirl chamber with a swirling action, due to the substantially tangential arrangement of the passages, the fuel passing from the swirl chamber 73a to the secondary chamber 87, at the opposite side of the orifice 83 from the swirl chamber, and thence through the emission orifice 56 to the interior of the burner tube.

Preferably, although not necessarily, the orifice member 83 is made of copper, or some material having similar characteristics, whereby it serves the additional functions of providing a resilient leakproof seat between the shell and the core, and to a certain extent acts as a lock for the core. Obviously, any leakage between the core and the shell will seriously affect proper functioning of the nozzle as a whole.

It has been found desirable to have the orifice 86, in the orifice member 83, of approximately twice the diameter of the emission opening 56 in the end wall 52 of the shell. As a result of provision of the orifice plate with the orifice therein of substantially double the diameter of the emission opening 56, atomizing may be obtained as for a pressure as low as 2 lbs. per sq. in. gauge, compared with a minimum heretofore obtainable pressure of 6 lbs. per sq. in. gauge. Furthermore, this construction permits satisfactory atomization with a flow of as low as 11 lbs. per hour as compared with a normal minimum satisfactory flow of 18 lbs. per hour. Thus, it will be apparent that applicant has provided a construction providing for satisfactory operation of a liquid fuel atomizing nozzle within a range of pressure and flow conditions of considerably lower minimum limits than is possible with constructions heretofore known.

While I have shown the invention in but one form, it will be obvious to those skilled in the art that it is not so limited, but is susceptible of various changes and modifications without departing from the spirit thereof.

What is claimed is:

1. A liquid fuel atomizing nozzle comprising an outer shell having a bore closed at one end and open at the opposite end, said closed end having an emission orifice therethrough; an inner core structure disposed in the bore and closing the open end thereof, said core structure having a swirl chamber formed by a recess in its inner end aligned with, and facing, the emission orifice; means for conducting fuel to said swirl chamber and for causing it to swirl therein; and a plate positioned between the swirl chamber and the emission orifice in spaced relation to the latter and provided with an orifice which is aligned with the emission orifice and is of greater cross sectional area than the latter, said plate being clamped by, and forming a seal between, the core structure and the shell.

2. A liquid fuel atomizing nozzle comprising an outer shell having a cylindrical chamber open at one end and closed at the opposite end by an end wall having an orifice therethrough coaxial with the chamber, an inner core structure positioned in the cylindrical chamber and closing the other end thereof, the inner portion of said core structure being circular in cross-section and of materially lesser diameter than the cylindrical chamber whereby there is provided between the core structure and the shell an annular space, the end face of said core structure which is opposed to the orificed end wall of the shell having a circular recess formed therein providing a swirl chamber coaxial with the cylindrical chamber and having its side wall separating it from the annular space between the core structure and the shell; means for admitting fuel under pressure to the annular space; means for directing the fuel from the annular space to the swirl chamber for swirling movement therein; and a relatively thin wall structure positioned between the swirl chamber and the orificed end wall of the shell and spaced from the latter, said thin wall structure having an orifice therethrough coaxial with the shell end wall orifice and of materially greater cross-sectional area than the latter, and said thin wall structure being clamped by, and providing a seal between, the core structure and the shell.

3. A liquid fuel atomizing nozzle comprising an outer shell providing a cylindrical bore open at the rear and closed at the opposite end by a front wall having an orifice therethrough coaxial with the bore, the inner surface of said front wall being concaved; a core structure positioned in said bore and closing the other end thereof, the forward portion of said core structure having its outer circumferential surface spaced from the inner circumferential surface of the bore a material distance to provide therebetween an annular flow path for fuel, and the front end of said core structure having a circular recess therein providing a swirl chamber; a diaphragm clamped between the inner concave surface of the shell front wall and the front end of the core structure, said diaphragm having a central portion normal to the axis of the bore and separating said swirl chamber recess from a space defined by the front side of said diaphragm central portion and the concaved inner surface of the shell front wall, said diaphragm having an orifice therethrough coaxial with the bore; means for conducting fuel to the annular space between the core structure and the shell side wall; and means for directing fuel from said annular space to the swirl chamber for swirling motion therein.

ALEXANDER S. KING, Jr.

REFERENCES CITED

The following references are of record in the file of this patent:

UNITED STATES PATENTS

| Number | Name | Date |
|---|---|---|
| 1,346,750 | Herman | July 13, 1920 |
| 1,461,545 | Purnell | July 10, 1923 |
| 1,656,894 | Haynes | Jan. 17, 1928 |
| 1,675,002 | Steiner | June 26, 1928 |
| 1,873,781 | Nightingale | Aug. 23, 1932 |
| 1,959,102 | Hummel | May 15, 1934 |
| 2,009,932 | Klotzman | July 30, 1935 |

FOREIGN PATENTS

| Number | Country | Date |
|---|---|---|
| 18,625 | Great Britain | Aug. 16, 1913 |